US010006235B2

(12) United States Patent
Young

(10) Patent No.: US 10,006,235 B2
(45) Date of Patent: Jun. 26, 2018

(54) VEHICLE SLIDING DOOR ASSEMBLIES AND VEHICLES INCLUDING THE SAME

(71) Applicant: Toyota Motor Engineering & Manufacturing North America, Inc., Erlanger, KY (US)

(72) Inventor: Jonathan R. Young, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 52 days.

(21) Appl. No.: 15/212,928

(22) Filed: Jul. 18, 2016

(65) Prior Publication Data

US 2018/0016828 A1 Jan. 18, 2018

(51) Int. Cl.

| | |
|---|---|
| ***E05D 15/10*** | (2006.01) |
| ***E05F 5/00*** | (2017.01) |
| ***E05F 5/06*** | (2006.01) |
| ***B60J 5/06*** | (2006.01) |

(52) U.S. Cl.

CPC .............. *E05D 15/101* (2013.01); *B60J 5/06* (2013.01); *E05F 5/003* (2013.01); *E05F 5/06* (2013.01); *E05Y 2900/531* (2013.01)

(58) Field of Classification Search

CPC ...... B60J 5/04; B60J 5/047; B60J 5/06; E05D 15/10; E05D 15/1005; E05D 15/101; E05F 3/20; E05F 5/003; E05F 5/06

USPC ................................ 296/146.11, 146.12, 155

See application file for complete search history.

(56) References Cited

U.S. PATENT DOCUMENTS 4,025,104 A 5/1977 Grossbach et al.
4,464,863 A 8/1984 Chikaraishi et al.
4,560,197 A * 12/1985 Minami ..................... B60J 5/06 296/155
5,895,089 A * 4/1999 Singh ......................... B60J 5/06 16/86 B
5,921,613 A * 7/1999 Breunig ..................... B60J 5/06 296/146.12
5,979,971 A * 11/1999 Mizuki ............... E05B 65/0811 292/219
6,328,374 B1 12/2001 Patel
8,282,156 B1 * 10/2012 Thiele ........................... 296/155
2009/0039673 A1 * 2/2009 Fukumoto ............... E05F 5/003 296/155

(Continued)

FOREIGN PATENT DOCUMENTS

GB 1558210 12/1979

OTHER PUBLICATIONS

"Auto Close Door Hinge for VW T5 Sliding door guide right side bottom long arm Sliding Door Roller Guide OEM 7H0843398H," http://www.alibaba.com/product-detail/auto-close-door-hinge-For-VW_1637110883.html; access date: Jan. 5, 2016.

*Primary Examiner* — Jason S Daniels
(74) *Attorney, Agent, or Firm* — Dinsmore & Shohl LLP

(57) ABSTRACT

A vehicle sliding door assembly includes a rail that extends in a vehicle longitudinal direction, a hard stop spaced apart from the rail in a vehicle vertical direction, a slide assembly including a follower member that is slidably engaged with the rail, and a closing member pivotally coupled to the follower member, where the closing member is repositionable between an open position, in which the closing member is spaced apart from the hard stop in the vehicle longitudinal direction, and a closed position, in which the closing member contacts the hard stop.

20 Claims, 8 Drawing Sheets

(56) References Cited

U.S. PATENT DOCUMENTS

2010/0127530 A1 * 5/2010 Elliott .......................... B60J 5/06
296/146.11

* cited by examiner

VEHICLE SLIDING DOOR ASSEMBLIES AND VEHICLES INCLUDING THE SAME

TECHNICAL FIELD

The present specification relates to vehicle sliding door assemblies and in particular to vehicle sliding door assemblies including a slide assembly. Vehicles including vehicle sliding door assemblies are also described.

BACKGROUND

Vehicles may include sliding doors that selectively cover a door opening to allow passenger ingress and egress from the vehicle. Repositioning the sliding door between an open position and a closed position conventionally includes moving the sliding door in a vehicle longitudinal direction along a track that is coupled to the vehicle body. To reposition the sliding door between the open position and the closed position, the track may guide the door outboard in a vehicle lateral direction so that the sliding door may move along an outside of the vehicle in the longitudinal direction.

To guide the sliding door outboard in the vehicle lateral direction, conventional rails include an arc or curve that extends inboard in the vehicle lateral direction. To accommodate the curve or arc in the rail, the body of the vehicle may include a discontinuity or pocket extending inboard from the vehicle body and positioned around the curve of the rail. The discontinuity may reduce the strength or stiffness of the vehicle body as evaluated in the vehicle lateral direction, which may reduce the ability of the body to absorb energy in the event of a side impact.

Accordingly, a need exists for alternative slide assemblies that move a sliding door in the vehicle lateral direction. By moving the sliding door in the vehicle lateral direction, the slide assembly may reduce the need for a curve in the track, thereby reducing the need for discontinuities in the vehicle body, which may increase the strength and/or stiffness of the vehicle body.

SUMMARY

In one embodiment, a vehicle sliding door assembly includes a rail that extends in a vehicle longitudinal direction, a hard stop spaced apart from the rail in a vehicle vertical direction, a slide assembly including a follower member that is slidably engaged with the rail, and a closing member pivotally coupled to the follower member, where the closing member is repositionable between an open position, in which the closing member is spaced apart from the hard stop in the vehicle longitudinal direction, and a closed position, in which the closing member contacts the hard stop.

In another embodiment, a vehicle includes a vehicle body having a roof member that extends in a vehicle longitudinal direction, a rail coupled to the roof member, where the rail extends in the vehicle longitudinal direction, a hard stop coupled to the vehicle body, a slide assembly engaged with the rail, the slide assembly including a follower member slidably engaged with the rail, a closing member pivotally coupled to the follower member, the closing member including an inboard end and an outboard end that is spaced apart from the inboard end, a damper coupled to the inboard end of the closing member, and a door coupled to the outboard end of the closing member.

In yet another embodiment, a vehicle includes a vehicle body including a roof member that extends in a vehicle longitudinal direction, a rail coupled to the roof member, where the rail extends in the vehicle longitudinal direction, a slide assembly engaged with the rail, the slide assembly including a follower member slidably engaged with the rail, a closing member pivotally coupled to the follower member, the closing member including an inboard end and an outboard end that is spaced apart from the outboard end, and a door coupled to the outboard end of the closing member, where the door is repositionable between an open position, in which the door is spaced apart from the follower member by a first distance, and a closed position, in which the door is spaced apart from the follower member by a second distance, where the first distance is greater than the second distance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicle sliding door assemblies according to the present disclosure include a slide assembly having a follower member that is engaged with a rail and a closing member pivotally coupled to the follower member. A sliding door may be coupled to the closing member. The slide assembly is repositionable between an open position and a closed position, and as the slide assembly moves between the open position and the closed position, the closing member pivots with respect to the follower member, moving the sliding door in a vehicle lateral direction. By moving the sliding door in the vehicle lateral direction by pivoting the closing member, the sliding door may be moved in the vehicle lateral direction in vehicle configurations in which the rail is straight or substantially straight. By maintaining the rail in a straight or substantially straight orientation, the strength and/or the stiffness of the vehicle may be increased as compared to vehicles having a rail that includes a curve that extends in the vehicle lateral direction. These and other embodiments will be described in more detail below in reference to the appended drawings.

Figure 1:
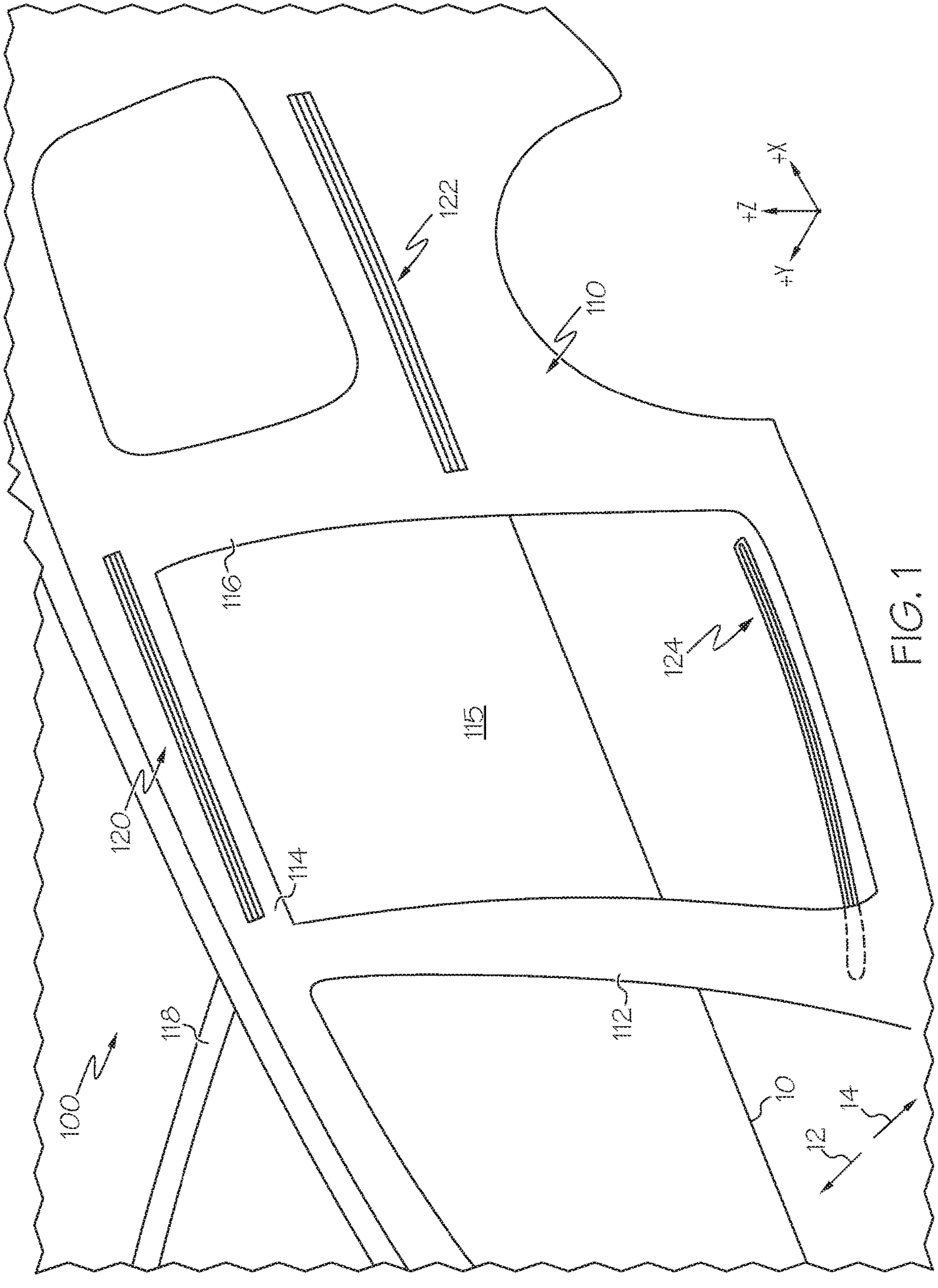
FIG. 1 schematically depicts a perspective view of a vehicle body according to one or more embodiments shown and described herein.

As used herein, the term “vehicle longitudinal direction” refers to the forward-rearward direction of the vehicle (i.e., in the +/−X-direction as depicted). The term “vehicle lateral direction” refers to the cross-wise direction of the vehicle (i.e., in the +/−Y-direction as depicted), and is transverse to the vehicle longitudinal direction. The term “vehicle vertical direction” refers to the upward-downward direction of the vehicle (i.e., in the +/−Z-direction as depicted). Referring to FIG. 1, the term “inboard” as used herein refers to the relative location of a component in direction 12 with respect to a vehicle centerline 10. The term “outboard” as used herein refers to the relative location of a component in direction 14 with respect to the vehicle centerline 10. Because the vehicle may be generally symmetrical about the vehicle centerline 10, the use of terms “inboard” and “outboard” may be switched when evaluating components positioned along opposite sides of the vehicle. Vehicles described herein may be generally symmetrical about the vehicle centerline 10 and may include corresponding components positioned on opposite sides of the vehicle. Accordingly, the direction to which use of terms “inboard” and “outboard” refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While embodiments of the present disclosure are described and depicted herein in reference to unibody structures, it should be understood that vehicles that are constructed with body-on-frame construction may incorporate the elements that are shown and described herein. Furthermore, the appended figures may only show one side of the vehicle. Descriptions of the other side of the vehicle may be omitted as both sides of the vehicle may be laterally symmetrical and substantially the same.

Referring initially to FIG. 1, a perspective view of a side of a vehicle 100 is depicted. The vehicle 100 includes a body 110 including a forward pillar 112, a roof member 114, a rearward pillar 116, and a roof cross member 118. The forward pillar 112 and the rearward pillar 116 extend in the vehicle vertical direction, and the roof member 114 extends in the vehicle longitudinal direction between and beyond the forward pillar 112 and the rearward pillar 116. The forward pillar 112 is positioned forward of the rearward pillar 116 in the vehicle longitudinal direction, and the roof member 114 is positioned above the forward pillar 112 and the rearward pillar 116 in the vehicle vertical direction. In embodiments, the forward pillar 112 and the rearward pillar 116 may include a B-pillar and a C-pillar of the vehicle 100, respectively. The roof member 114, the forward pillar 112, and the rearward pillar 116 define a door opening 115 positioned between the forward pillar 112 and the rearward pillar 116 in the vehicle longitudinal direction. The door opening 115 may allow occupant ingress and egress from the vehicle 100. The body 110 may further include the roof cross member 118, which extends from the roof member 114 in the vehicle lateral direction across the body 110.

The vehicle 100 includes one or more rails 120, 122, 124 that couple a sliding door 113 (FIG. 2) to the body 110. In embodiments, the body 110 includes an upper rail 120, a center rail 122, and a lower rail 124. The center rail 122 is positioned between the upper rail 120 and the lower rail 124 in the vehicle vertical direction. The upper rail 120 extends along the roof member 114 in the vehicle longitudinal direction and extends rearward from the forward pillar 112. The center rail 122 may extend rearward from the rearward pillar 116 in the vehicle longitudinal direction. The lower rail 124 extends rearward from the forward pillar 112 in the vehicle longitudinal direction. The upper rail 120, the center rail 122, and the lower rail 124 may support the sliding door 113 (FIG. 2) and may guide movement of the sliding door 113 (FIG. 2) in the vehicle longitudinal direction to selectively cover the door opening 115.

Figure 2:
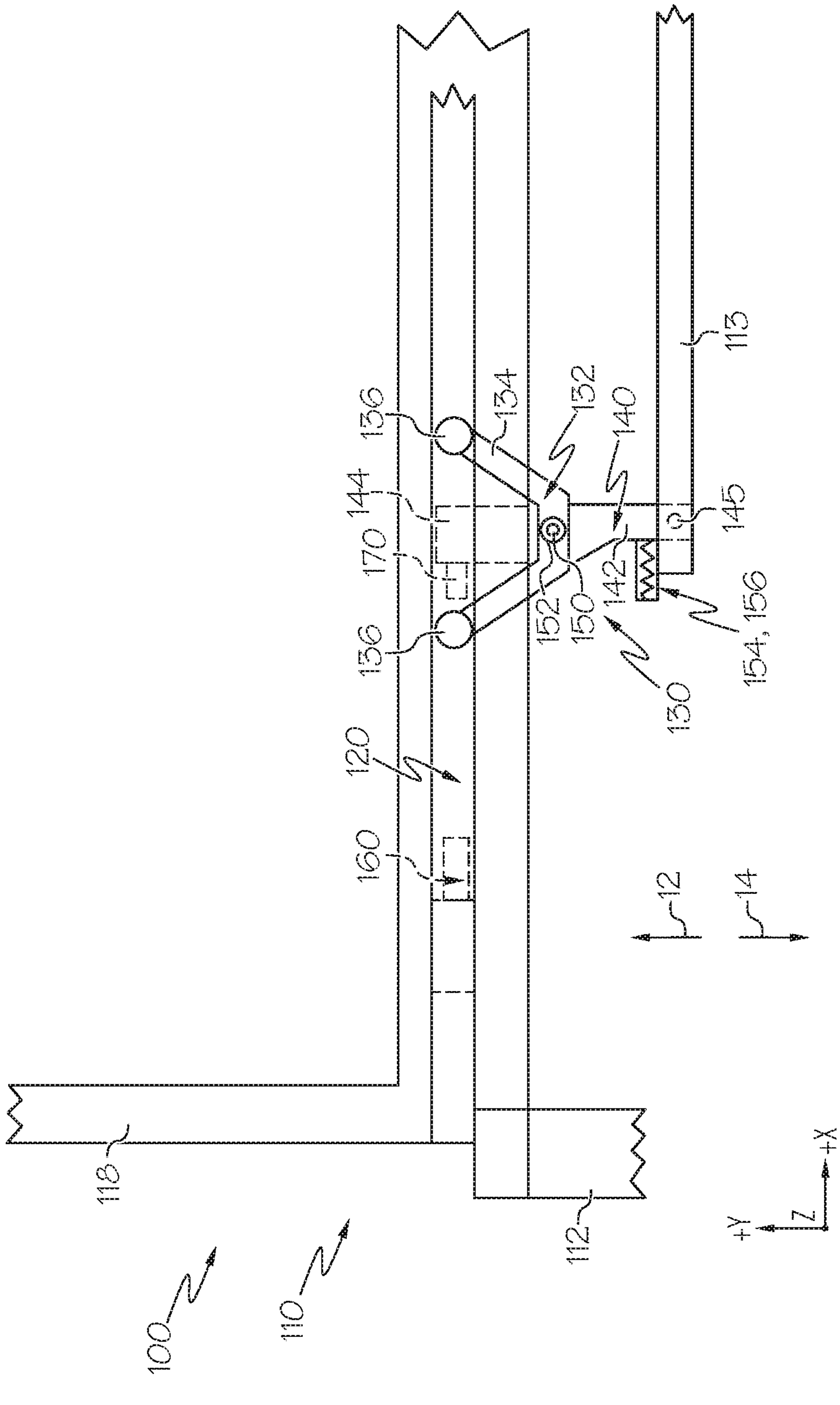
FIG. 2 schematically depicts a top view of a vehicle sliding door assembly including a slide assembly according to one or more embodiments shown and described herein.

Referring to FIG. 2, a top view of the upper rail 120 is schematically depicted. A slide assembly 130 is positioned at least partially within the upper rail 120. The sliding door 113 is coupled to the slide assembly 130, and the sliding door 113 is engaged with the upper rail 120 through the slide assembly 130. While the slide assembly 130 is described and depicted as being engaged with the upper rail 120, it should be understood that the slide assembly 130 may be engaged with any one of the upper rail 120, the center rail 122 (FIG. 1), or the lower rail 124 (FIG. 1), and separate slide assemblies may be coupled to the sliding door 113 and engaged with each of the upper rail 120, the center rail 122, and the lower rail 124.

The slide assembly 130 includes a follower member 132 and a closing member 140 that is pivotally coupled to the follower member 132. The follower member 132 includes a roller or rollers 136 that are positioned at least partially within the upper rail 120. The rollers 136 are slidably engaged with the upper rail 120 such that the slide assembly 130 may translate with respect to the upper rail 120, and accordingly the body 110, in the vehicle longitudinal direction. The rollers 136 may be engaged with the upper rail 120 such that the follower member 132 may move freely with respect to the upper rail 120 in the vehicle longitudinal direction, however, movement of the follower member 132 with respect to the upper rail 120 in the vehicle lateral direction and the vehicle vertical direction is restricted.

The follower member 132 includes a follower bracket 134 that is coupled to and extends outboard from the rollers 136 in the vehicle lateral direction. In the embodiment depicted in FIG. 2, the follower bracket 134 is generally C-shaped and extends between a pair of rollers 136 in the vehicle longitudinal direction. While the follower bracket 134 is described and depicted as being generally C-shaped, it should be understood that the follower bracket 134 may include any suitable shape that is coupled to and extends outboard from the rollers 136.

The closing member 140 extends in the vehicle lateral direction and is pivotally coupled to the follower bracket 134. The closing member 140 includes an inboard end 144 and an outboard end 142 that is spaced apart from the inboard end 144. The closing member 140 is pivotally coupled to the follower member 132 at a pivot 150 that is positioned between the inboard end 144 and the outboard end 142. The pivot 150 may include a pin or the like that allows the closing member 140 to pivot with respect to the follower member 132 about the pivot 150. The pivot 150 may extend in the vehicle vertical direction, such that the closing member 140 pivots with respect to the follower member 132 about the vertical direction.

In embodiments, the sliding door 113 is pivotally coupled to the outboard end 142 of the closing member 140 at pivot location 145. By pivotally coupling the sliding door 113 to the closing member 140, the sliding door 113 may remain in a generally longitudinal orientation as the closing member 140 rotates about the pivot 150. The slide assembly 130 may optionally include a closing biasing member 154 and/or a closing damper 156 coupled to the outboard end 142 of the closing member 140. The closing biasing member 154 and/or the closing damper 156 may make contact with the forward pillar 112 when the sliding door 113 is moved into a closed position. The closing damper 156 may include a viscous damper or the like that resists motion in the vehicle longitudinal direction. The closing biasing member 154 may include a compression spring, a torsion spring, a tension spring, or the like.

Figure 3:
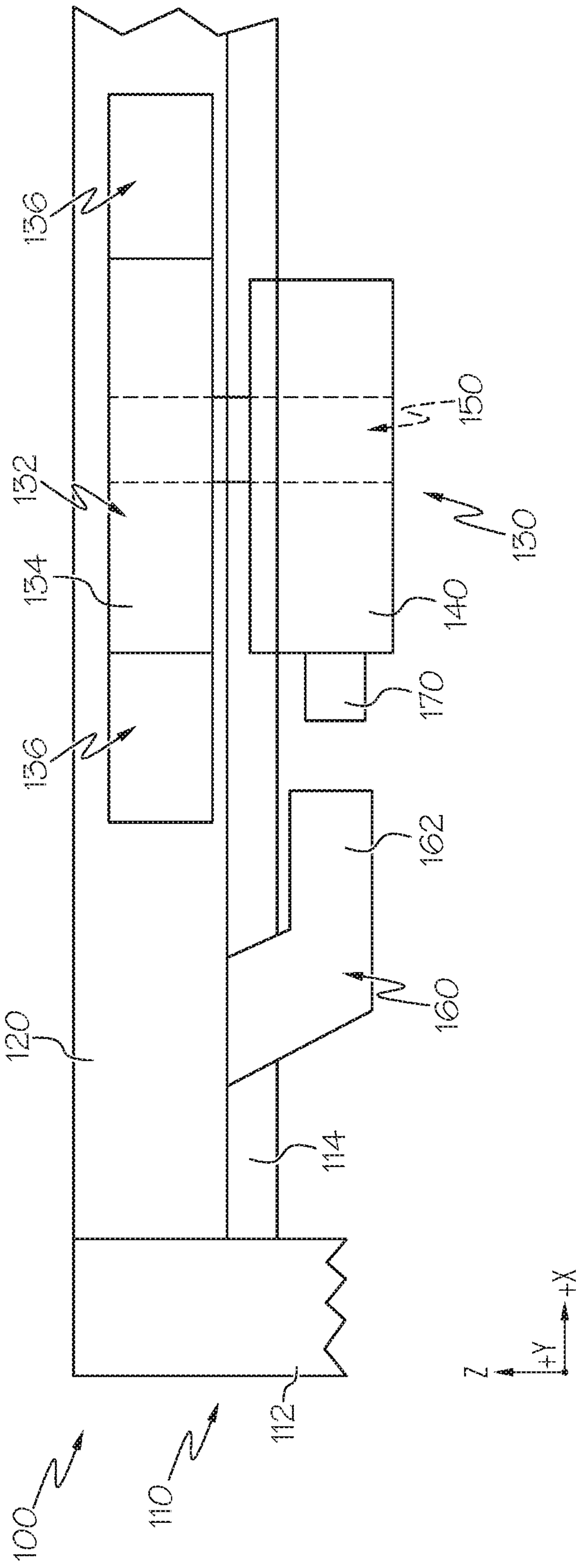
FIG. 3 schematically depicts a side view of the slide assembly of FIG. 2 according to one or more embodiments shown and described herein.

Referring to FIG. 3, a side view of the slide assembly 130 is depicted. In embodiments, the closing member 140 is positioned below the follower member 132 in the vehicle vertical direction. Alternatively, in some embodiments, the closing member 140 may be positioned above the follower member 132 in the vehicle vertical direction.

A hard stop 160 is coupled to the body 110 of the vehicle 100. In the embodiment depicted in FIG. 3, the hard stop 160 is coupled to the roof member 114. Alternatively or additionally, the hard stop 160 may be coupled to the upper rail 120. The hard stop 160 includes an engagement portion 162 that extends in the vehicle longitudinal direction and is spaced apart from the upper rail 120 in the vehicle vertical direction. In embodiments, the engagement portion 162 is positioned below the upper rail 120 in the vehicle vertical direction. Alternatively, the hard stop 160 and the engagement portion 162 may be positioned above the upper rail 120 in the vehicle vertical direction.

Figure 4:
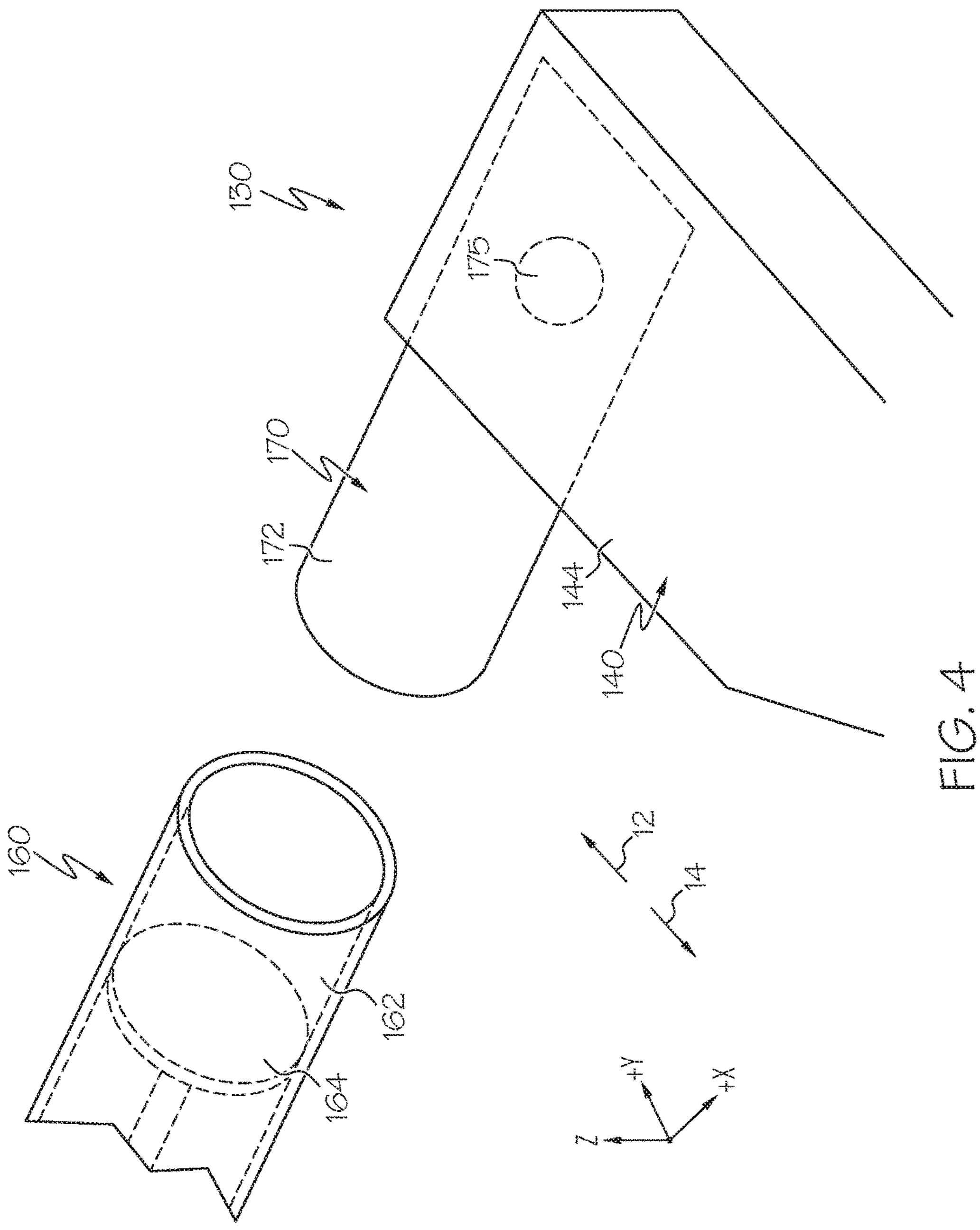
FIG. 4 schematically depicts a perspective view of a hard stop and a damper of the slide assembly of FIG. 2 according to one or more embodiments shown and described herein.

Referring to FIG. 4, a perspective view of the hard stop 160 and the inboard end 144 of the closing member 140 is schematically depicted. The slide assembly 130 includes a damper 170 coupled to the inboard end 144 of the closing member 140. The damper 170 may include a viscous linear damper or the like that resists motion in the longitudinal direction. The damper 170 may be pivotally coupled to the closing member 140 at pivot location 175 such that the damper 170 may pivot with respect to the closing member 140 about the vertical direction. By allowing the damper 170 to pivot with respect to the closing member 140, the damper 170 may remain in a generally longitudinal orientation when the closing member 140 rotates about the pivot 150 (FIG. 3).

In embodiments, the hard stop 160 and the damper 170 include complementary and corresponding shapes. In the embodiment depicted in FIG. 4, the hard stop 160 includes the engagement portion 162 that extends in the vehicle longitudinal direction. The damper 170 includes a male component 172 that is shaped to correspond with the engagement portion 162 of the hard stop 160, such that the damper 170 may be inserted within the hard stop 160. When the damper 170 is inserted within the hard stop 160, movement of the damper 170 in the vehicle lateral direction and the vehicle vertical direction may be restricted through contact with the hard stop 160. The hard stop 160 may include a stopper portion 164 positioned within the engagement portion 162 that contacts the damper 170 when the damper 170 is inserted within the engagement portion 162. The position of the hard stop 160 and/or the stopper portion 164 of the hard stop 160 may be adjustable in the vehicle longitudinal direction with respect to the upper rail 120 (FIG. 3) such that the damper 170 may contact the stopper portion 164 when the damper 170 is inserted within the engagement portion 162. Alternatively, the position of the damper 170 may be adjustable in the vehicle longitudinal direction with respect to the closing member 140 such that the damper 170 may contact the stopper portion 164 when the damper 170 is inserted within the engagement portion 162. While the hard stop 160 and the damper 170 are depicted as being cylindrically shaped, it should be understood that the hard stop 160 and the damper 170 may include any suitable corresponding and complementary shapes.

Figure 5A:
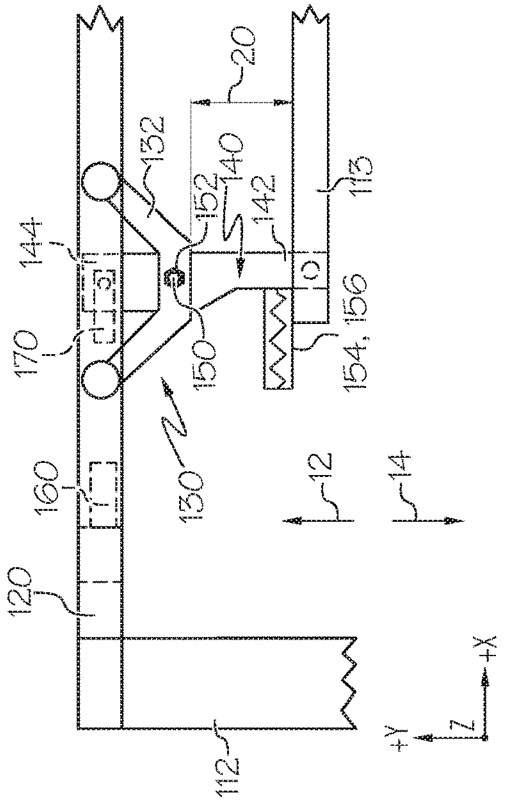
FIG. 5A schematically depicts a top view of the slide assembly of FIG. 2 in an open position according to one or more embodiments shown and described herein.

Referring to FIG. 5A, a top view of the slide assembly 130 is depicted in an open position. When the slide assembly 130 is in the open position, the sliding door 113 is positioned rearward in the vehicle longitudinal direction to allow passenger ingress/egress through the door opening 115 (FIG. 1). In particular, the slide assembly 130 is spaced apart from the hard stop 160 in the vehicle longitudinal direction and accordingly, the damper 170 of the slide assembly 130 is spaced apart from the hard stop 160 in the vehicle longitudinal direction. The closing member 140 of the slide assembly 130 is oriented to extend in the vehicle lateral direction when the slide assembly 130 is in the open position such that the inboard end 144 is positioned inboard of the pivot 150 and the outboard end 142 in the vehicle lateral direction. In embodiments, the slide assembly 130 may include a biasing member 152 coupled to the follower member 132 and the closing member 140. The biasing member 152 biases the closing member 140 into the open position. The biasing member 152 may include a torsion spring, a tension spring, a compression spring, or the like.

When in the open position, the sliding door 113 is spaced apart from the follower member 132 by a first distance 20. By spacing the sliding door 113 apart from the follower member 132 by the first distance 20, the sliding door 113 may be spaced apart from the body 110 (FIG. 1) of the vehicle 100 (FIG. 1), such that the sliding door 113 may move in the vehicle longitudinal direction along the upper rail 120 to selectively provide access to the door opening 115 (FIG. 1). The slide assembly 130 is repositionable between the open position, as shown in FIG. 5A, and a closed position, as shown in FIG. 5B.

Figure 5B:
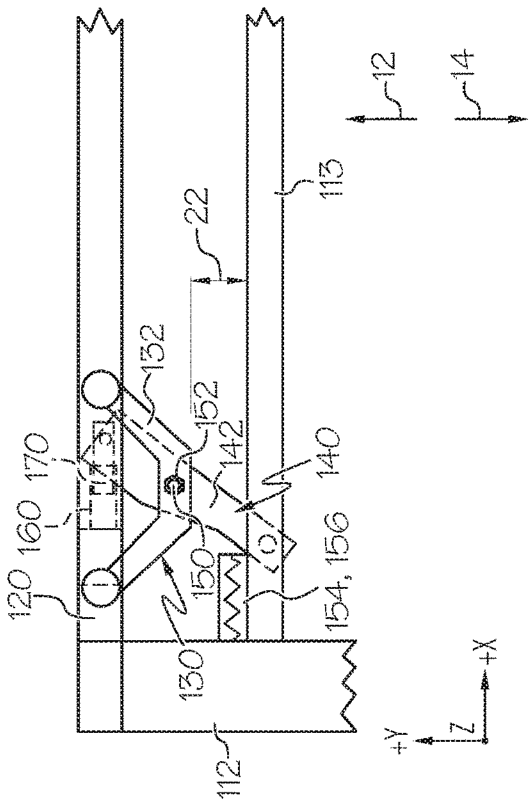
FIG. 5B schematically depicts a top view of the slide assembly of FIG. 5A in a closed position according to one or more embodiments shown and described herein.

Referring to FIG. 5B, a top view of the slide assembly 130 is depicted in a closed position. When the slide assembly 130 is in the closed position, the sliding door 113 is positioned in the vehicle longitudinal direction to cover the door opening 115 (FIG. 1), and the slide assembly 130 contacts the hard stop 160. In particular, the damper 170 of the slide assembly 130 contacts the hard stop 160, and engagement between the damper 170 and the hard stop 160 restricts forward movement (i.e., in the –X-direction) of the damper 170 in the vehicle longitudinal direction. As forward movement of the damper 170 is restricted through contact with the hard stop 160, and as the slide assembly 130 continues to move forward in the vehicle longitudinal direction, the closing member 140 rotates with respect to the follower member 132 about the pivot 150. In particular, the closing member 140 rotates about the pivot 150 such that the outboard end 142 of the closing member 140 moves forward of the pivot 150 and the inboard end 144 of the closing member 140 in the vehicle longitudinal direction. As the closing member 140 rotates about the pivot 150, the outboard end 142 of the closing member 140 also moves inboard in the vehicle lateral direction. As the sliding door

113 is coupled to the outboard end 142 of the closing member 140, the sliding door 113 moves inboard in the vehicle lateral direction, such that the sliding door 113 is spaced apart from the follower member 132 by a second distance 22. The second distance 22 is less than the first distance 20 (FIG. 5A), such that the sliding door 113 is positioned closer to the body 110 (FIG. 1) of the vehicle 100 (FIG. 1) in the vehicle lateral direction when the slide assembly 130 is in the closed position as compared to when the slide assembly 130 is in the open position. In this way, the slide assembly 130 moves the sliding door 113 (FIG. 2) inboard in the vehicle lateral direction when the slide assembly 130 is in the closed position.

As the slide assembly 130 moves the sliding door 113 (FIG. 2) inboard through pivoting the closing member 140, the slide assembly 130 may move the sliding door 113 inboard even though the upper rail 120 is straight or substantially straight, as depicted in FIG. 5B.

Figure 8:
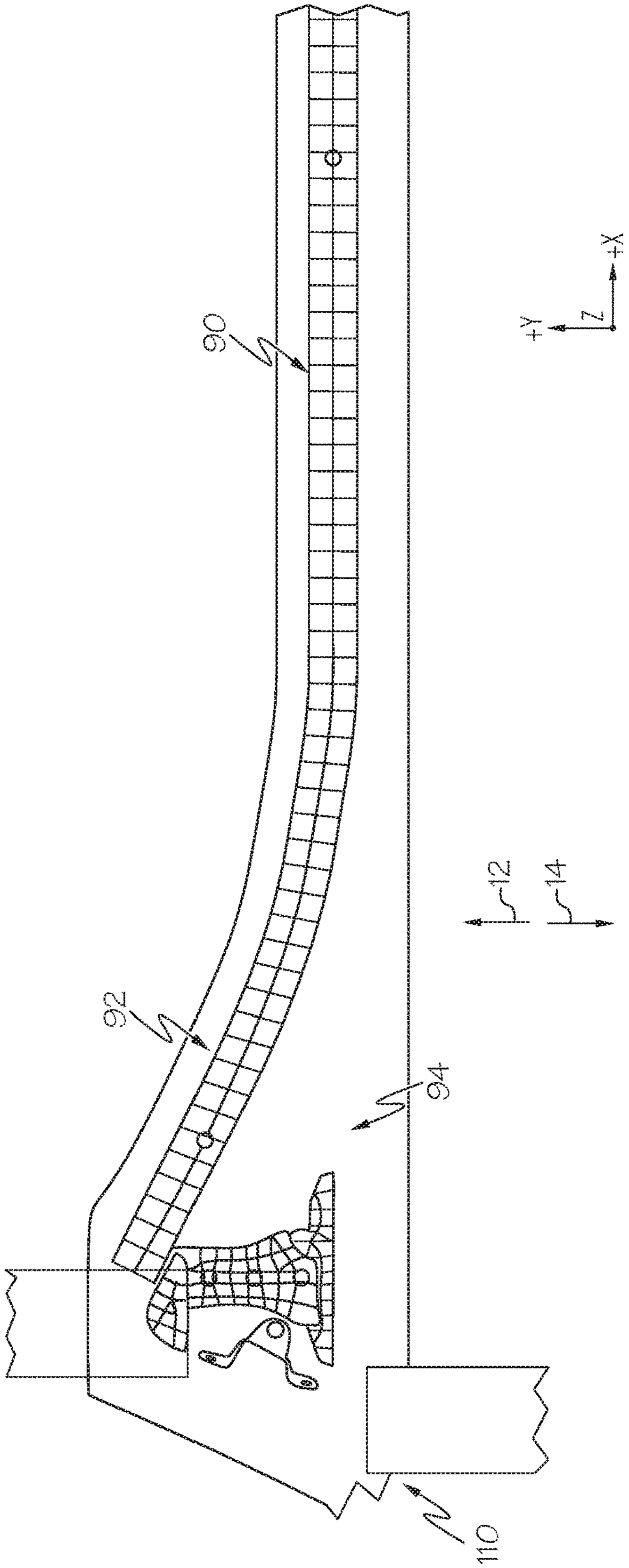
FIG. 8 (PRIOR ART)
FIG. 8 schematically depicts a top view of a conventional rail.

By contrast and referring to FIG. 8, a top view of a conventional rail 90 is depicted. Conventional vehicles may include a conventional rail 90 that includes a curve 92 extending in the vehicle lateral direction that guides the sliding door inboard and outboard in the vehicle lateral direction as the sliding door is repositioned between an open position and a closed position. To accommodate the curve 92 in the conventional rail 90, the vehicle may include a pocket 94 that extends inboard of the body 110 in the vehicle lateral direction. The pocket 94 may reduce the strength or stiffness of the body 110 as evaluated in the vehicle lateral direction.

Accordingly, and referring again to FIG. 5B, by including the slide assembly 130 that moves the sliding door 113 in the vehicle lateral direction through pivoting the closing member 140, the upper rail 120 may be maintained in a straight or substantially straight orientation in the vehicle longitudinal direction. By maintaining the upper rail 120 in a straight or substantially straight orientation in the vehicle longitudinal direction, the need for pockets or discontinuities in the body 110 (FIG. 1) may be reduced or eliminated. By reducing the need for pockets or discontinuities in the body 110 (FIG. 1), the strength and/or the stiffness of the body 110 (FIG. 1) may be increased as compared to vehicles that include a conventional rail 90 (FIG. 8) with a curve 92 (FIG. 8).

Figure 6:
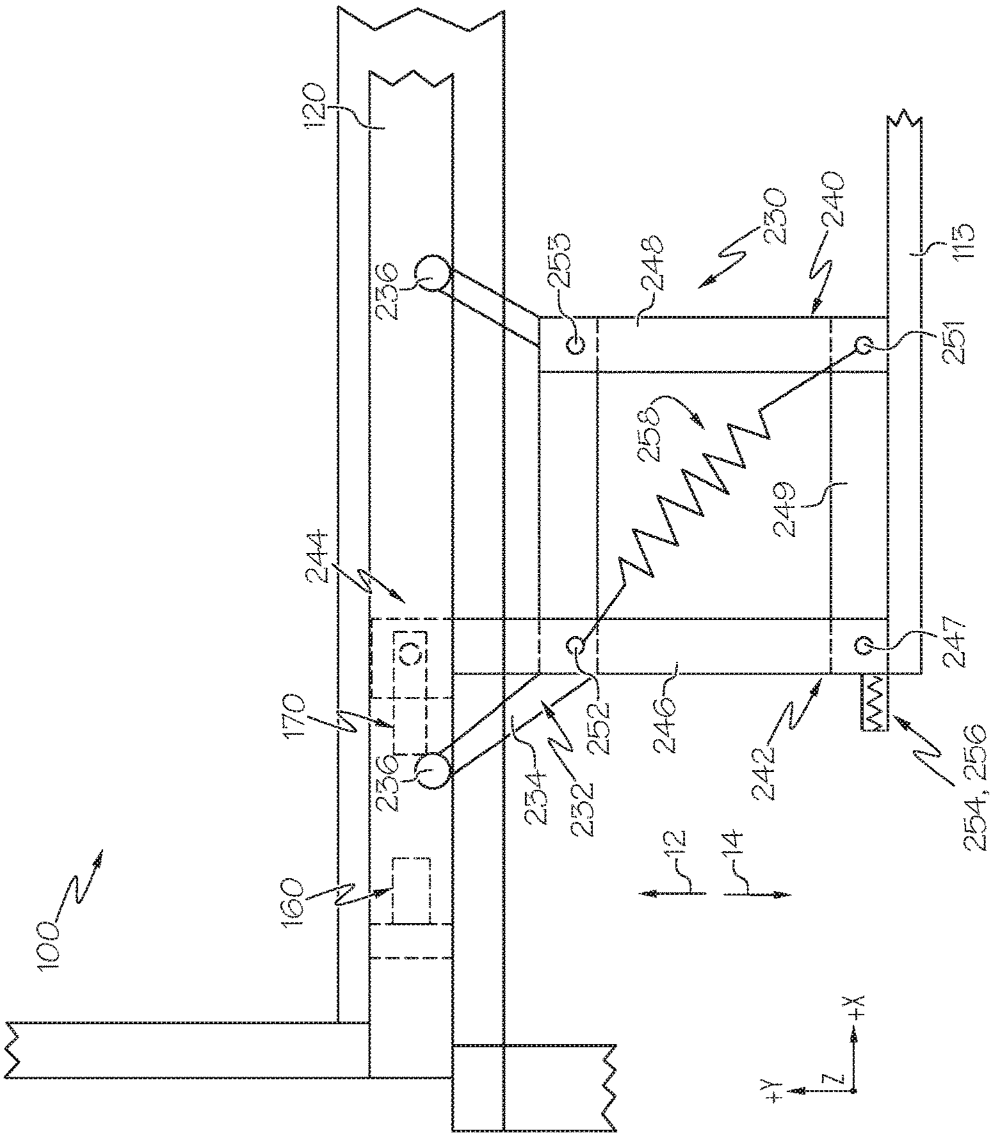
FIG. 6 schematically depicts a top view of a slide assembly according to one or more embodiments shown and described herein.

Referring to FIG. 6, a top view of another slide assembly 230 is depicted. Similar to the embodiment depicted in FIG. 2, the slide assembly 230 includes a follower member 232 and a closing member 240. In the embodiment depicted in FIG. 6, the closing member 240 includes a forward member 246 and a rearward member 248 that are pivotally coupled to the follower member 232 at a forward pivot 252 and a rearward pivot 253, respectively. The closing member 240 may optionally include an outboard member 249 that is pivotally coupled to the forward member 246 and the rearward member 248.

The follower member 232 includes a roller or rollers 236 that are positioned at least partially within the upper rail 120. The rollers 236 are slidably engaged with the upper rail 120 such that the slide assembly 230 may translate with respect to the upper rail 120, and accordingly, the body 110, in the vehicle longitudinal direction. The rollers 236 may be engaged with the upper rail 120 such that the follower member 232 may move freely with respect to the upper rail 120 in the vehicle longitudinal direction, however, movement of the follower member 232 with respect to the upper rail 120 in the vehicle lateral direction and the vehicle vertical direction is restricted.

The follower member 232 includes a follower bracket 234 that is coupled to and extends outboard from the rollers 236. In the embodiment depicted in FIG. 6, the follower bracket 234 is generally C-shaped and extends between a pair of rollers 236 in the vehicle longitudinal direction. While the follower bracket 234 is described and depicted as being generally C-shaped, it should be understood that the follower bracket 234 may include any suitable shape that is coupled to and extends outward from the rollers 236.

The closing member 240 includes the forward member 246 that extends in the vehicle lateral direction and that is pivotally coupled to the follower bracket 234. The forward member 246 of the closing member 240 includes an inboard end 244 and an outboard end 242 that is spaced apart from the inboard end 244. The forward member 246 is pivotally coupled to the follower bracket 234 at the forward pivot 252, which is positioned between the inboard end 244 and the outboard end 242. The forward pivot 252 may include a pin or the like that allows the forward member 246 of the closing member 240 to pivot with respect to the follower member 232 about the forward pivot 252. The forward pivot 252 extends in the vehicle vertical direction, such that the forward member 246 pivots with respect to the follower member 232 about the vertical direction.

The closing member 240 includes the rearward member 248 that is spaced apart from and positioned rearward of the forward member 246 and that extends in the vehicle lateral direction. The rearward member 248 is pivotally coupled to the follower bracket 234 at the rearward pivot 253. The rearward pivot 253 may include a pin or the like that allows the rearward member 248 of the closing member 240 to pivot with respect to the follower member 232 about the rearward pivot 253. The rearward pivot 253 extends in the vehicle vertical direction, such that the rearward member 248 pivots with respect to the follower member 232 about the vertical direction.

In embodiments, the sliding door 113 is pivotally coupled to the forward member 246 and the rearward member 248 of the closing member 240 such that the sliding door 113 may remain in a generally longitudinal orientation as the forward member 246 pivots about the forward pivot 252 and the rearward member 248 pivots about the rearward pivot 253. In embodiments, the sliding door 113 may be coupled to the outboard member 249, which may be pivotally coupled to the forward member 246 at pivot location 247 and the rearward member 248 at pivot location 251 of the closing member 240 such that the sliding door 113 may remain in a generally longitudinal orientation as the forward member 246 and rearward member 248 pivot about the forward pivot 252 and rearward pivot 253, respectively. The slide assembly 230 may optionally include a closing biasing member 254 and/or a closing damper 256 coupled to the outboard end 242 of the forward member 246. The closing biasing member 254 and/or the closing damper 256 may make contact with the forward pillar 112 when the sliding door 113 is moved into a closed position. The closing damper 256 may include a viscous damper or the like that resists motion in the vehicle longitudinal direction. The closing biasing member 254 may include a compression spring, a torsion spring, a tension spring, or the like.

In embodiments, the forward member 246 and the rearward member 248 of the closing member 240 are positioned below the follower member 232 in the vehicle vertical direction. Alternatively, in some embodiments, the forward member 246 and the rearward member 248 may be positioned above the follower member 232 in the vehicle vertical direction.

Similar to the embodiment described above and depicted in FIG. 4, the slide assembly 230 includes the damper 170 that is coupled to the inboard end 244 of the forward member 246. As with the embodiment depicted in FIG. 4, the damper 170 and the hard stop 160 include complementary and corresponding shapes. The damper 170 may be pivotally coupled to the forward member 246 such that the damper 170 may pivot with respect to the forward member 246 about the vehicle vertical direction. By allowing the damper 170 to pivot with respect to the forward member 246 of the closing member 240, the damper 170 may remain in a generally longitudinal orientation when the forward member 246 rotates about the forward pivot 252.

Figure 7B:
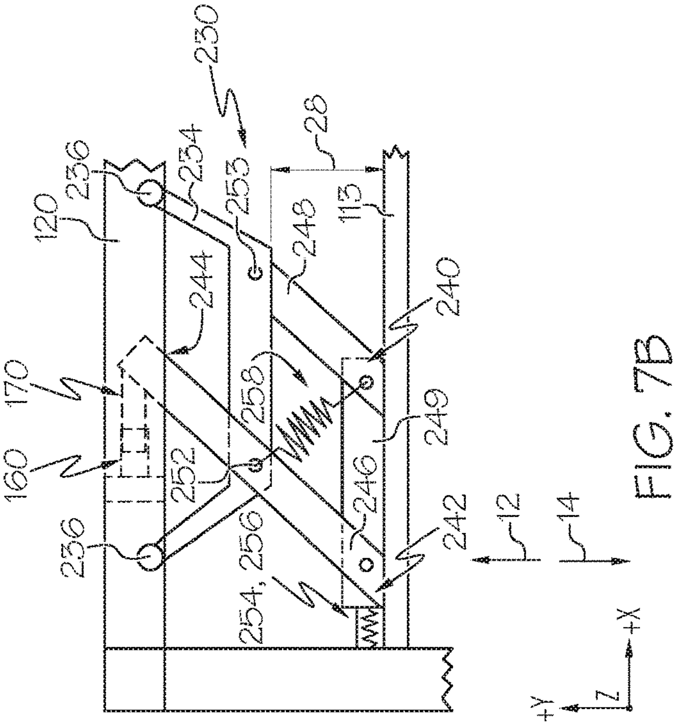
FIG. 7B schematically depicts a top view of the slide assembly of FIG. 7A in a closed position according to one or more embodiments shown and described herein.
Figure 7A:
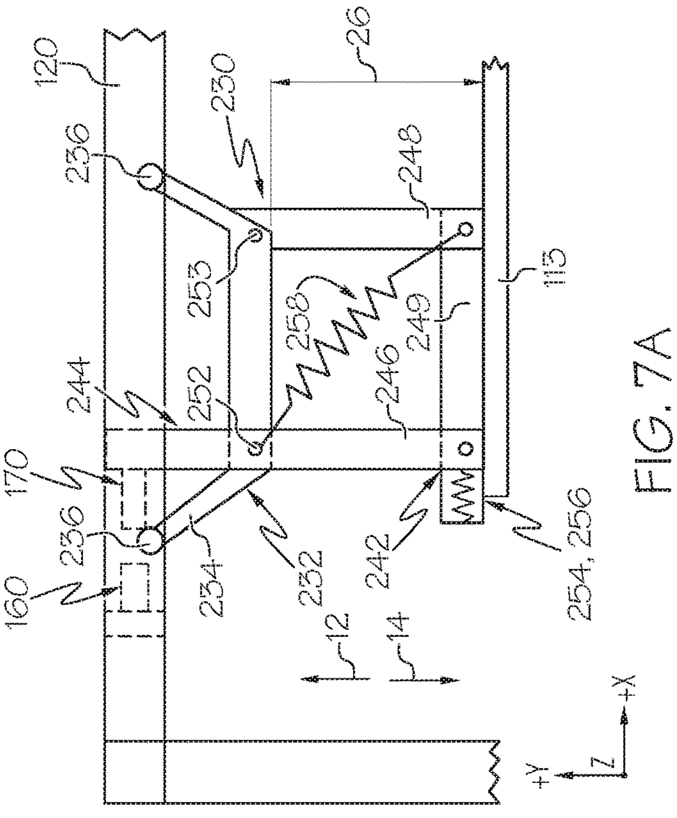
FIG. 7A schematically depicts a top view of the slide assembly of FIG. 6 in an open position according to one or more embodiments shown and described herein.

Referring to FIG. 7A, a top view of the slide assembly 230 is depicted in an open position. When the slide assembly 230 is in the open position, the sliding door 113 is positioned in the vehicle longitudinal direction to allow passenger ingress/egress through the door opening 115 (FIG. 1). In particular, the slide assembly 230 is spaced apart from the hard stop 160 in the vehicle longitudinal direction and accordingly, the damper 170 of the slide assembly 230 is spaced apart from the hard stop 160 in the vehicle longitudinal direction. The forward member 246 and the rearward member 248 of the slide assembly 230 are oriented to extend in the vehicle lateral direction when the slide assembly 230 is in the open position such that the inboard end 244 of the forward member 246 is positioned inboard of the forward pivot 252 and the outboard end 242 in the vehicle lateral direction. In embodiments, the slide assembly 230 may include a biasing member 258 coupled to the forward member 246 and the rearward member 248. The biasing member 258 biases the forward member 246 and the rearward member 248 into the open position. The biasing member 258 may include a torsion spring, a tension spring, a compression spring, or the like.

When in the open position, the sliding door 113 is spaced apart from the follower member 232 by a first distance 26. By spacing the sliding door 113 apart from the follower member 232 by the first distance 26, the sliding door 113 may be spaced apart from the body 110 (FIG. 1) of the vehicle 100 (FIG. 1), such that the sliding door 113 may move in the vehicle longitudinal direction along the upper rail 120 to selectively provide access to the door opening 115 (FIG. 1). The slide assembly 230 is repositionable between the open position, as shown in FIG. 7A, and a closed position, as shown in FIG. 7B.

Referring to FIG. 7B, a top view of the slide assembly 230 is depicted in a closed position. When the slide assembly 230 is in the closed position, the sliding door 113 is positioned in the vehicle longitudinal direction to cover the door opening 115 (FIG. 1), and the slide assembly 230 contacts the hard stop 160. In particular, the damper 170 of the slide assembly 230 contacts the hard stop 160, and engagement between the damper 170 and the hard stop 160 restricts forward movement (i.e., in the −X-direction) of the damper 170 in the vehicle longitudinal direction. As forward movement of the damper 170 is restricted through contact with the hard stop 160, and as the slide assembly 230 continues to move forward in the vehicle longitudinal direction, the forward member 246 and the rearward member 248 rotate with respect to the follower member 232 about the forward pivot 252 and the rearward pivot 253, respectively. In particular, the forward member 246 rotates about the forward pivot 252 such that the outboard end 242 moves forward of the forward pivot 252 and the inboard end 244 of the forward member 246 in the vehicle longitudinal direction. As the forward member 246 rotates about the forward pivot 252, the outboard end 242 of the forward member 246 also moves inboard in the vehicle lateral direction. As the sliding door 113 is coupled to the outboard end 242 of the forward member 246, the sliding door 113 moves inboard in the vehicle lateral direction, such that the sliding door 113 is spaced apart from the follower member 232 by a second distance 28. The second distance 28 is less than the first distance 26 (FIG. 7A), such that the sliding door 113 is positioned closer to the body 110 (FIG. 1) of the vehicle 100 (FIG. 1) in the vehicle lateral direction when the slide assembly 230 is in the closed position as compared to when the slide assembly 230 is in the open position. In this way, the slide assembly 230 moves the sliding door 113 inboard in the vehicle lateral direction when the slide assembly 230 is in the closed position.

As the slide assembly 230 moves the sliding door 113 inboard through pivoting the closing member 240, the slide assembly 230 may move the sliding door 113 inboard in vehicles in which the upper rail 120 is straight or substantially straight, as depicted in FIG. 5B. As described above, by maintaining the upper rail 120 in a straight or substantially straight orientation in the vehicle longitudinal direction, the strength and/or the stiffness of the body 110 (FIG. 1) of the vehicle 100 (FIG. 1) may be increased as compared to vehicles that include conventional rails 90 (FIG. 8) with curves 92 (FIG. 8) that extend in the vehicle lateral direction. Further, by coupling the sliding door 113 to a forward member 246 and a rearward member 248, the slide assembly 230 may have multiple points of contact with the sliding door 113, which may assist in providing a stable connection between the sliding door 113 and the slide assembly 230.

It should now be understood that vehicle sliding door assemblies according to the present disclosure include a slide assembly having a follower member that is engaged with a rail and a closing member pivotally coupled to the follower member. A sliding door may be coupled to the closing member. The slide assembly is repositionable between an open position and a closed position, and as the slide assembly moves between the open position and the closed position, the closing member pivots with respect to the follower member, moving the sliding door in a vehicle lateral direction. By moving the sliding door in the vehicle lateral direction by pivoting the closing member, the sliding door may be moved in the vehicle lateral direction in vehicle configurations in which the rail is straight or substantially straight. By maintaining the rail in a straight or substantially straight orientation, the strength and/or the stiffness of the vehicle may be increased as compared to vehicles including a rail that includes a curve that extends in the vehicle lateral direction.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle sliding door assembly comprising:

a rail that extends in a vehicle longitudinal direction;

a hard stop spaced above or below the rail in a vehicle vertical direction;

a slide assembly comprising:

a follower member that is slidably engaged with the rail; and a closing member pivotally coupled to the follower member, wherein the closing member is repositionable between an open position, in which the closing member is spaced apart from the hard stop in the vehicle longitudinal direction, and a closed position, in which the closing member contacts the hard stop.

2. The vehicle sliding door assembly of claim 1, wherein at least a portion of the hard stop extends in the vehicle longitudinal direction.

3. The vehicle sliding door assembly of claim 1, wherein the closing member comprises an inboard end and an outboard end that is positioned outboard of the inboard end in a vehicle lateral direction when the closing member is in the open position, and wherein the closing member comprises a damper coupled to the inboard end.

4. The vehicle sliding door assembly of claim 3, wherein the closing member is pivotally coupled to the follower member at a pivot, and wherein the damper is positioned inboard of the pivot in the vehicle lateral direction when the closing member is in the open position.

5. The vehicle sliding door assembly of claim 4, wherein the outboard end of the closing member is positioned forward of the pivot in the vehicle longitudinal direction when the closing member is in the closed position.

6. The vehicle sliding door assembly of claim 3, wherein the damper contacts the hard stop when the closing member is in the closed position and the damper is spaced apart from the hard stop in the vehicle longitudinal direction when the closing member is in the open position.

7. The vehicle sliding door assembly of claim 3, wherein the closing member further comprises a forward member pivotally coupled to the follower member at a forward pivot, and a rearward member positioned rearward of the forward member in the vehicle longitudinal direction, the rearward member pivotally coupled to the follower member at a rearward pivot.

8. The vehicle sliding door assembly of claim 7, wherein the damper is coupled to the forward member.

9. The vehicle sliding door assembly of claim 1, further comprising a biasing member coupled to the slide assembly, wherein the biasing member biases the closing member into the open position.

10. A vehicle comprising:

a vehicle body comprising a roof member that extends in a vehicle longitudinal direction;

a rail coupled to the roof member, wherein the rail extends in the vehicle longitudinal direction;

a hard stop coupled to the vehicle body;

a slide assembly engaged with the rail, the slide assembly comprising:

a follower member slidably engaged with the rail;

a closing member pivotally coupled to the follower member, the closing member comprising an inboard end and an outboard end that is spaced apart from the inboard end;

a damper coupled to the inboard end of the closing member; and a door pivotally coupled to the outboard end of the closing member.

11. The vehicle of claim 10, wherein at least a portion of the hard stop extends in the vehicle longitudinal direction.

12. The vehicle of claim 10, wherein the slide assembly comprises a pivot positioned between the inboard end and the outboard end of the closing member, wherein the closing member is pivotally coupled to the follower member at the pivot.

13. The vehicle of claim 12, wherein the closing member is repositionable between an open position, in which the inboard end is positioned inboard of the pivot in a vehicle lateral direction, and a closed position, in which the inboard end is positioned rearward of the pivot in the vehicle longitudinal direction.

14. The vehicle of claim 12, wherein the closing member further comprises a forward member pivotally coupled to the follower member at a forward pivot, and a rearward member positioned rearward of the forward member in the vehicle longitudinal direction, the rearward member pivotally coupled to the follower member at a rearward pivot.

15. The vehicle of claim 14, wherein the damper is coupled to the forward member.

16. A vehicle comprising:

a vehicle body comprising a roof member that extends in a vehicle longitudinal direction;

a rail coupled to the roof member, wherein the rail extends in the vehicle longitudinal direction;

a slide assembly engaged with the rail, the slide assembly comprising:

a follower member slidably engaged with the rail;

a closing member pivotally coupled to the follower member, the closing member comprising an inboard end and an outboard end that is spaced apart from the inboard end; and a door pivotally coupled to the outboard end of the closing member, wherein the door is repositionable between an open position, in which the door is spaced apart from the follower member by a first distance, and a closed position, in which the door is spaced apart from the follower member by a second distance, wherein the first distance is greater than the second distance.

17. The vehicle of claim 16, further comprising a damper coupled to the inboard end of the closing member.

18. The vehicle of claim 16, further comprising a biasing member coupled to the slide assembly, the biasing member biasing the door into the open position.

19. The vehicle of claim 16, wherein the inboard end is positioned rearward of the outboard end in the vehicle longitudinal direction when the slide assembly is in the closed position.

20. The vehicle of claim 16, wherein the closing member further comprises a forward member pivotally coupled to the follower member at a forward pivot, and a rearward member positioned rearward of the forward member in the vehicle longitudinal direction, the rearward member pivotally coupled to the follower member at a rearward pivot.

* * * * *